United States Patent [19]

Kohl

[11] Patent Number: 5,499,736

[45] Date of Patent: Mar. 19, 1996

[54] RECLOSABLE, REMOVABLE CAP FOR REUSABLE SHAKER DISPENSER BOTTLE

[75] Inventor: Garrett W. Kohl, Harrison, N.Y.

[73] Assignee: Kraft Foods, Inc., Northfield, Ill.

[21] Appl. No.: 174,558

[22] Filed: Dec. 28, 1993

[51] Int. Cl.[6] .......................... B65D 51/18; B65D 47/00
[52] U.S. Cl. .......................... 220/254; 220/339; 215/237; 222/556
[58] Field of Search .................... 220/254, 259, 220/339; 215/235, 237; 222/556, 545

[56] References Cited

U.S. PATENT DOCUMENTS

| | | |
|---|---|---|
| D. 227,085 | 6/1973 | Nigro . |
| D. 278,312 | 4/1985 | Cleevely et al. . |
| D. 292,889 | 11/1987 | Ostrowsky . |
| D. 331,877 | 12/1992 | Robichaud et al. . |
| D. 335,817 | 5/1993 | Greubel . |
| D. 340,188 | 10/1993 | Forsyth . |
| 3,323,671 | 6/1967 | Minarik, Jr. et al. ............ 215/237 |
| 3,419,198 | 12/1968 | Pettersen ............ 220/254 X |
| 4,457,458 | 7/1984 | Heinol ............ 215/235 X |
| 4,533,058 | 8/1985 | Uhlig ............ 215/237 X |
| 4,801,054 | 1/1989 | Nycz ............ 222/556 X |
| 5,048,730 | 9/1991 | Forsyth et al. ............ 222/556 X |
| 5,094,361 | 3/1992 | Dubach ............ 222/556 X |

Primary Examiner—Allan N. Shoap
Assistant Examiner—Jes F. Pascua
Attorney, Agent, or Firm—Thomas R. Savoie; Thomas A. Marcoux

[57] ABSTRACT

A removable and reclosable, substantially leak-free and fling-free cap member for sealably engaging the open top portion of a reusable shaker dispenser bottle or similar container is provided. Reduction or elimination of product fling from the strap closure upon opening of the pouring orifice is provided by placing the hinge of the strap to the top of the sidewall and by introducing controlled weakness of the plastic in the hinge area. Controlled rotational flexibility about a defined axis of symmetry and side placement of thumb flanges permits easy removal of the cap without compromising sealing effectiveness. An inverted teardrop pouring orifice provides a controlled-flow, universal recipe orifice for dispensing thin viscosity and thicker viscosity fluid products, with or without particulates.

11 Claims, 2 Drawing Sheets

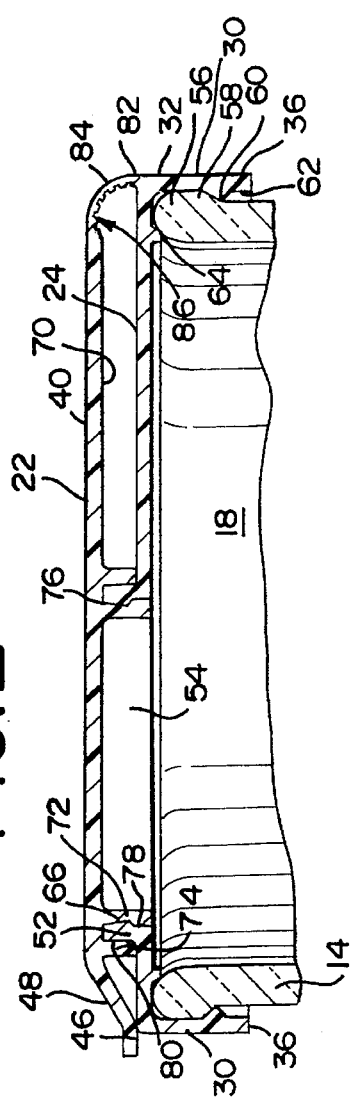
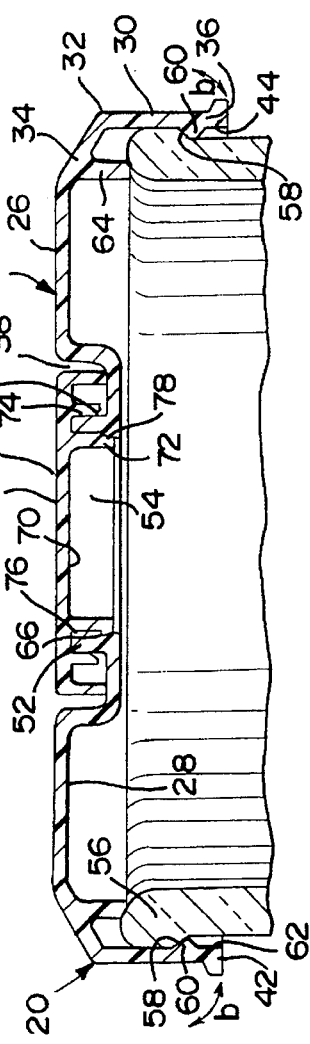
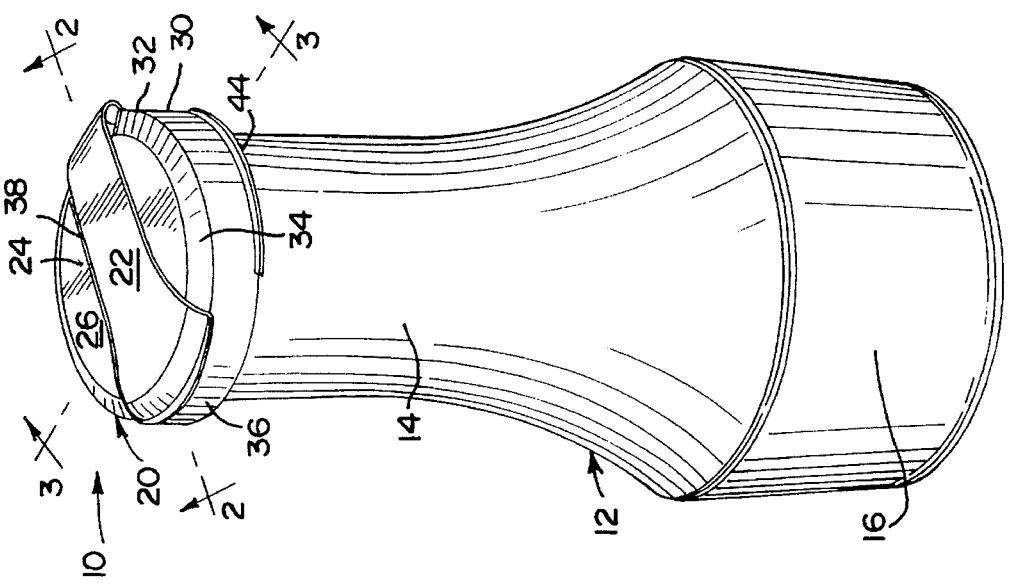

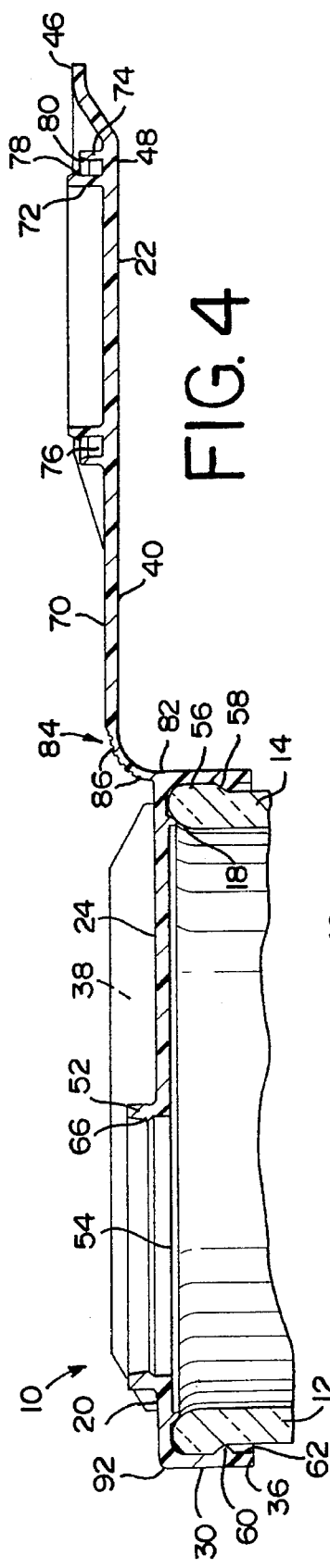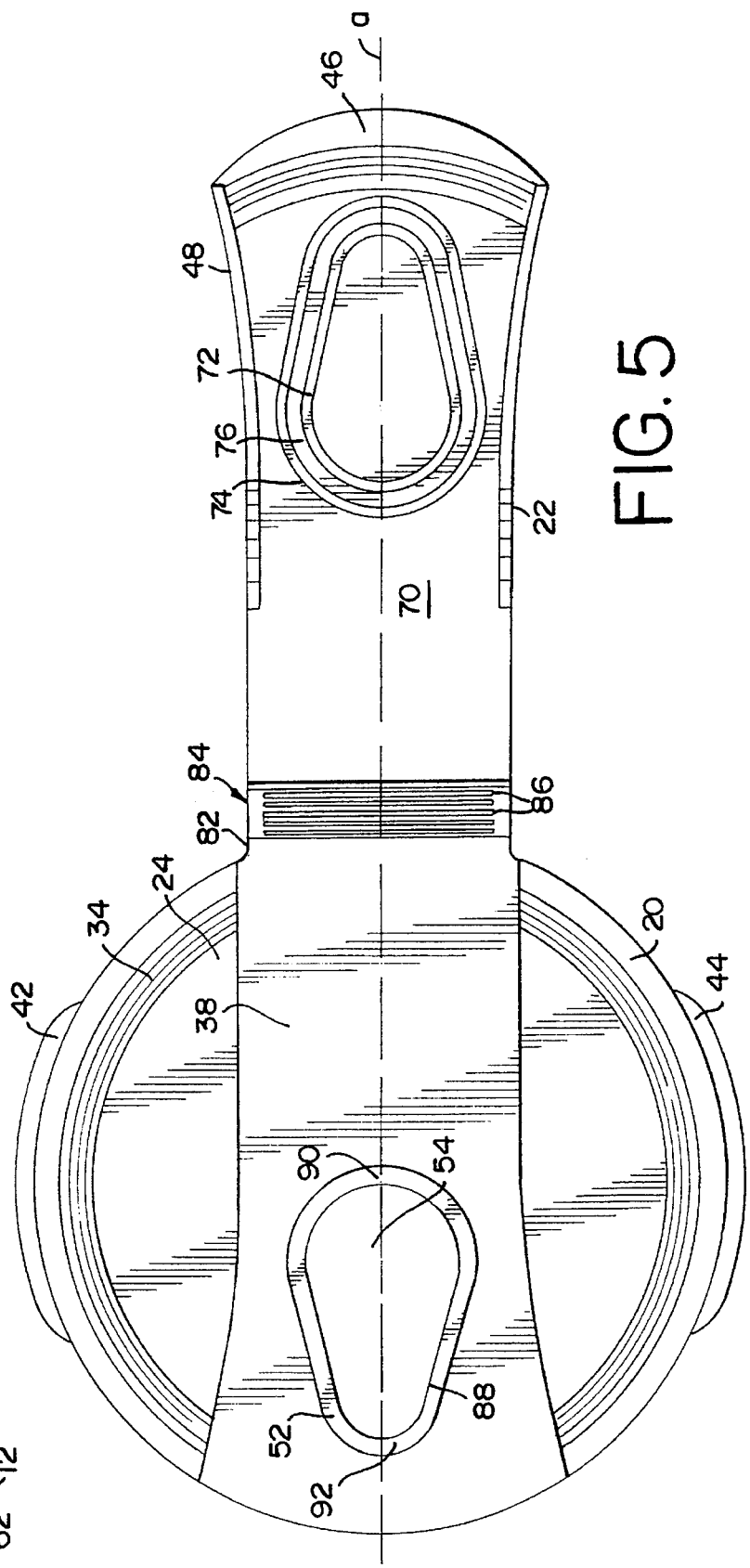

RECLOSABLE, REMOVABLE CAP FOR REUSABLE SHAKER DISPENSER BOTTLE

BACKGROUND OF THE INVENTION

The present invention generally relates to reusable shaker dispenser bottles or containers of the type used in the home for making, mixing, serving and storing fluid foodstuffs, such as salad dressings, powdered drink mixes, ready-to-mix sauces, marinades, condiments and the like. More particularly, it relates to a new and improved removable and reclosable, substantially leak-free and fling-free cap member for sealably engaging the open top portion of a reusable shaker dispenser bottle, decanter or other storage vessel.

Reusable storage containers specifically suited for use as an all-in-one shaker/mixing bottle, at-table server, and refrigerator storage container are well known. An illustrative reusable container of this type is the reusable cruet provided for making GOOD SEASONS® salad dressings. Typically, the cruet bottle or vessel is made of see-through glass or a food-safe thermoplastic polymer material. The cruet has a lower base portion and an upper elongate cylindrical neck portion provided with a generally circular top opening.

Caps or lids for the shake, serve and store containers come in a large number of styles. Most are molded from a resilient flexible thermoplastic polymer material and have a generally circular or thin cylindrical configuration. The caps generally include a bottle contacting portion adapted to form a removable fluid-tight seal with the container top opening when the cap is fully installed thereon. Many caps also provide a reclosable opening defining a pouring orifice. A smaller lid structure is provided to recap or close the orifice for shaking and for storage. The smaller lids are usually provided with some type of cooperating engagement or locking means for maintaining the small lid in its closed preferably fluid-tight position on the pouring orifice.

Two-piece structures including the smaller orifice lid and the larger cap member are known but often the smaller top lid becomes lost or separated from the main portion of the cap, which is undesirable. One-piece designs are also known and generally solve this problem. The one-piece cap designs usually include an elongate strap flexibly connected at a first end to the base or body of the cap and having a snap-fit or snap-lock orifice closing portion disposed at the opposed free end of the strap. In use the strap is bent through an angle of greater than 90° to overlie the top in a generally sideways U-shaped configuration to permit the cooperative locking structures on the free end of the strap to be engaged with the orifice opening in the top panel. The unitary or one-piece tops are well known and several minor modifications have been made to improve their performance over the years. In the salad dressing cruet bottle example, the cap body must remain in place during vigorous shaking and the smaller orifice lid must also remain engaged on the orifice opening to prevent leakage of the dressing contents from the bottle during mixing or use. The sealing structures therefore must form strong fluid-tight seals about the pouring orifice and the bottle top, respectively. Although a strong fluid-tight seal is needed, the release force required to disengage the orifice lid or to remove the cap from the bottle for dishwasher washing, for example, should also be low enough that they may be easily removed when desired. These design considerations frequently are counter-fit with each other, i.e., an increase in sealing forces usually also requires an increase in the removal force.

Although prior art one-piece caps have been useful for their purpose, a number of shortcomings have been identified by consumers familiar with their use. More particularly, consumers desire a cap member having an orifice covering equipped with a snap-fit cooperative sealing structures which are substantially leak-free. In addition, the fit of the cap to the glass top should be easier to remove, but also not leak. Another problem consumers have identified is that on releasing the orifice closure, the prior art one-piece strap designs have a tendency to spring open, causing any residue on the inside surface of the orifice lid to fling outwardly, due to stored tension in the strap which consumers find annoying. Moreover, consumers expressed a desire to make their own dressings from their own relatively fresh ingredients including not only thin viscosity, vinaigrette-type oil-based dressings, but also thicker and chunkier dressings such as ranch or blue cheese. The pouring orifices provided in prior art caps and lids frequently did not have an orifice designed to be universally suited for both thin and thicker recipes. Orifices designed to provide controlled flow of vinaigrette-type, low-viscosity dressings generally do not easily permit the pouring of thicker recipes. Thicker recipes tend to stop up prior openings or to glug uncontrollably which is undesirable. Similarly, efforts at enlarging the diameter of the orifice to accommodate thicker recipes has resulted in an orifice which is too large for most oil-based dressings, promoting excessive flow and making it difficult to pour a controlled volume therefrom.

Accordingly, to overcome the shortcomings of the prior art caps and to specifically accommodate the expressed wishes of consumers, it is an object of the present invention to provide a new and improved one-piece removable and reclosable cap for a reusable shaker bottle which is substantially leak-proof and fling-free when the cooperative locking engagement structures closing the pouring orifice are released.

It is another object of the present invention to provide a new and improved removable reclosable cap having a universal pouring orifice with a new and improved flow control configuration which permits the thin recipes to be poured with control, i.e., without excessive flow, and thicker recipes to flow smoothly therefrom in use.

It is another object of the present invention to provide a new and improved removable reclosable cap member for a reusable shaker dispenser bottle which forms strong substantially leak-free fluid-tight seals between the cap member and the dispenser bottle and which is easy to remove when it is desired to remove the cap from the bottle for cleaning and replenishing.

SUMMARY OF THE INVENTION

In accordance with these and other objects, the present invention provides a new and improved substantially leak-proof, removable and reclosable cap for sealably engaging a top opening portion of a reusable container, such as a shaker dispenser bottle or cruet or a drink mix decanter or the like. The new and improved cap member comprises a cap body including a top wall and a depending peripheral sidewall. Means for forming a strong, substantially leak-free, fluid-tight seal between the top portion of the container and the underside surface and depending peripheral sidewall portions of the cap body are provided. A pouring orifice is disposed in the top wall and positioned to permit a fluid product contained in the container to be poured therethrough in use. The cap further includes an elongate flexible strap means having a first end affixed to the cap body and an opposed free end. The free end of the strap includes means for forming a releasable cooperative sealing interengagement with said pouring orifice.

In accordance with one aspect of this invention, the new and improved cap member includes means for reducing the likelihood of product fling upon release of the cooperative sealing engagement means about the pouring orifice. In a preferred embodiment, the fling-reduction properties are provided by disposing the first fixed end of the strap so that it extends from the cap body at an upper portion of the depending sidewall adjacent the upper surface of the top wall. Moreover, the strap is bent through an angle of greater than 90° so that the free end overlies the top wall and said pouring orifice which defines a sideways U-shaped bight portion to the strap between the fixed end and the free end, preferably immediately adjacent the fixed end. The bight portion defines a hinge section of the strap about which the free end of the strap may be rotatably pivoted with respect to the top wall.

In accordance with a preferred embodiment, the hinge section of the strap is thinned and portions of the strap material are removed to effectively reduce the amount of stored potential energy in the strap upon closure of the pouring orifice by the free end. The free end and bight portion of the strap will tend to want to resiliently return to their flat as-molded condition. By relieving material from the bight section, the stored material stresses in the cap member may be reduced so that, on opening, the strap resiles to only an intermediate position between 180° (closed position) and a 0° (as-molded, fully open position) and preferably resiles only to a position between about 110° and 70° of arc to provide unobstructed product dispensing through the pouring orifice with little or no product fling.

In accordance with another aspect of the invention, it has now been determined that a universal controlled pouring configuration for the pouring orifice is provided by an inverted teardrop shaped orifice. The inverted teardrop pouring orifice includes a converging portion with angled side surfaces approaching one another at a first end disposed adjacent a peripheral edge of the top wall of the cap member. The inverted teardrop orifice also includes a rounded, curved or semi-circular portion opposite the converging portion. The inverted teardrop shaped pouring orifice is a universal pouring orifice because it permits and promotes smooth, controlled flow of both thinner and thicker recipe fluids and even thicker fluids containing large particulates, such as chunky blue cheese dressings.

In accordance with another preferred aspect of this invention, the new and improved cap member includes means for providing controlled flexure of the cap body to facilitate disengagement and removal of the cap body from the top portion of the container. In a preferred embodiment, the new and improved cap member is molded so that it has a longitudinally extending diametrical axis of symmetry which effectively bisects the pouring orifice and strap member which are aligned therewith. The cap body is generally mirror-image symmetrical about this first axis. A pair of outwardly projecting flange members may be provided at the lower free end portion of the depending peripheral sidewall along side portions thereof on opposed sides of said axis of symmetry. The flange portions provide a thumb pressure release feature which allows the cap member to rotationally flex about the axis of symmetry to make it easier to overcome the sealed engagement of the container sealing portions of the cap member to facilitate removal of the cap member. Moreover, extending the free end of the strap so that a tab extends beyond the orifice sealing and engagement structures also provides a convenient place to assert the required thumb pressure needed to overcome the cooperative sealed interlocking means defined between the pouring orifice and the free end of the strap.

Other objects and advantages of the present invention will become apparent from the following Detailed Description, taken in conjunction with the Drawings, in which:

BRIEF DESCRIPTION OF THE DRAWINGS

FIG. 1 is a perspective view of the new and improved removable reclosable cap member shown in a closed shake or storage position disposed in fluid-tight sealed gripping engagement on the top opening portion of a reusable cruet shaker dispenser bottle;

FIG. 2 is an elevated cross-sectional view of the new and improved cap member taken along view lines 2—2 in FIG. 1;

FIG. 3 is an elevated cross-sectional view of the new and improved cap member taken along view lines 3—3 in FIG. 1;

FIG. 4 is an elevated cross-sectional view of the new and improved cap member depicted in FIG. 1 with the strap member and pouring orifice closure portion shown in fully open position; and FIG. 5 is a top plan view of the new and improved cap member in its fully opened flat as-molded condition.

DETAILED DESCRIPTION OF THE PREFERRED EMBODIMENT

Referring now to FIG. 1, the new and improved cap member 10 is shown in an installed closed position on the top portion 14 of a cruet style shaker dispenser bottle 12. Cruet 12 includes an enlarged base portion 16 which gradually tapers into top portion 14 having a generally elongate generally cylindrical configuration. The top opening 18 provided in top portion 14 accordingly has a generally circular configuration.

Cap member 10 is preferably a unitary or one-piece article molded to shape from a flexible, resilient thermoplastic polymer material approved for food contact. The polymer material should be flexible and resilient enough to continuously provide fluid-tight seals after repeated opening and closing cycles and after repeated installation and removal cycles even after repeated dishwashing or at commonly reduced refrigeration temperatures. A preferred material is a moldable polyolefin polymer and linear, low-density polyethylene polymers and molding compositions are especially preferred.

Referring now to FIGS. 1–5, cap member 10 includes a cap body 20 and a strap portion 22 extending therefrom. Cap body 20 includes a top wall 24 having opposed upper and lower surfaces 26 and 28 respectively. Cap body 20 additionally includes a depending peripheral sidewall 30 having an upper end portion 32 connected to the beveled peripheral edge 34 of top wall 24 and a lower free end portion 36. In the preferred embodiment shown in the drawings, top wall 10 is preferably provided with a wide (about 40–60% the width of top surface 24) strap-receiving recess 38 which permits the outwardly facing surface 40 on strap 22 to lie flush with the adjacent upper surface 26 of top wall 24 in the closed position shown in FIGS. 1–3 to provide a clean, neat and contemporary appearance.

In accordance with a this invention, a pair of outwardly projecting flange portions 42 and 44 extend from the lower free end portion 36 of depending sidewall 30 along opposed portions of the circumference defined by lower portion 36 on opposed spaced apart locations on either side of the strap receiving recess 38 to facilitate controlled flexing and removal of the cap body 20 from top opening 18 of the top portion 14. Each diametrically-opposed flange preferably only extends across a segment of the circumference of sidewall 30, as shown in FIG. 5. A segment angle of about 75° to 105° will be typical. If a single flange were to extend continuously around side wall 30 flexibility of the cap body would be diminished.

Preferably, a thumb tab extension 46 is provided at the free end 48 of strap 22. This extension will facilitate disengagement of the orifice sealing members 72 and 74 on strap 22 from the cooperating lip latch structure 52 defined along and about the universal recipe pouring orifice 54.

As shown in the preferred embodiment best illustrated in FIGS. 2–4, cap body 20 includes means for forming a strong fluid-tight seal between cap body 20 and cruet top opening 18. More particularly, upper portion 14 of cruet bottle 12 adjacent top opening 18 is preferably with a slightly flaring rounded peripheral lip portion 56 including an inwardly angled cam surface 58 defined along the lower or underside thereof. Depending peripheral sidewall 30 is provided with a projecting bead or ridge 60 on an inner surface 62 thereof. A continuous, depending, deformable sealing vane 64 projects downwardly, part from lower surface 28 of top wall 24, as shown in FIG. 3, and in part from the lower surface of strap-receiving recess 38, as shown in FIG. 2, at a point spaced radially inwardly from inner surface 62 on depending sidewall 30. Preferably the outer surface of sealing vane 64 is tapered downwardly and inwardly to facilitate sealing engagement with lip portion 56 of cruet opening 18.

In accordance with this preferred embodiment, as cap body 20 is pressed downwardly over top opening 18, the lower portion 36 of sidewall 30 flexes outwardly so that bead or ridge 60 can clear and ride over cruet lip 56. As soon as ridge 60 contacts angled cam surface 58, the resilient sidewall 30 resiles back inwardly causing ridge 60 to travel downwardly along cam surface 58. This in turn causes depending vane 64 to contact top opening 18 and to be compressed and deflected inwardly in a strong, fluid-tight, surface to surface sealing contact with or against the top opening 18 around its entire circumference.

Referring again to FIGS. 2–4, in accordance with the preferred embodiment, the new and improved cap member 10 includes means for forming a releasable cover seal for the pouring orifice 54. As depicted in the drawings the pouring orifice is defined by a raised projecting latch lip 52 extending upwardly within the central recess 38. Latch lip 52 includes a latch shoulder 66 defined along the inwardly-facing side thereof.

The free end 48 on strap 22 is provided with cooperating snap lock orifice sealing structures 72 and 74 extending from an underside surface 70 of strap 22. As shown in FIGS. 2–4, the orifice cover sealing means include a projecting inner annular latch arm 72 projecting outwardly from the underside surface 70 of strap 22 and a second smaller secondary seal lock wall 74 spaced radially outwardly of latch arm 72 and defining a sealing and locking groove 76 therebetween. Latch arm 72 includes a locking ledge 78 adapted to cooperatively engage latch shoulder 66 on latch lip 52. A tapered lead-in 80 is defined on lock wall 74 to guide the end of lip latch 52 into sealed and locked engagement within sealing groove 76 as shown.

In accordance with one important aspect of this invention, cap member 10 is easier to install and remove because it is provided with an axis of symmetry, a, shown in FIG. 5 extending diametrically across cap body 20 and effectively bisecting the pouring orifice 54 and the strap member 22. The position and configuration of pouring orifice 54 and the width of strap-receiving recess 38 provides a controlled flexibility in top wall 24 along axis a in an upwardly rotating direction as shown by directional arrows, b, in FIG. 3.

In accordance with a second major aspect, the cap member 10 is provided with anti-fling features. More particularly and referring to FIGS. 2 and 4–5, a significant reduction in the tendency of the strap 22 to fling cruet contents upon release of the orifice cover seal is provided by affixing or adjoining a fixed end 82 of strap 22 so that it extends from an upper portion 32 of depending peripheral sidewall 30 as compared to lower free end portion 36, as was the prior art practice. Immediately adjacent fixed end 82 is a hinge portion 84 which may contain characterized by a plurality of parallel spaced apart grooves 86 extending transverse to the length of strap 22.

Cap member 10 is molded in the flat fully opened condition shown in FIGS. 4 and 5. In use, the strap is bent upwardly and inwardly from the position of FIG. 4 to the position of FIG. 2 so that the free end 48 of strap 22 is positioned to cover the pouring orifice 54 and a portion of the strap 22 is received in the recess 38. In the closed position of FIG. 2, strap 22 has been bent a full 180° in a U-shaped, hairpin turn at bight or hinge section 84 from the 0° position shown in FIG. 4. Strap member 22 is molded from a resilient thermoplastic composition which takes on a shape memory or first permanent set in the molding operation which is oriented to the 0° position of FIG. 4. The closing of the strap 22 to the position of FIG. 2 creates residual stresses in the strap 22, in the form of potential energy, which will cause the strap to spring or resile open to the as-molded, relaxed condition of FIG. 4.

In accordance with this aspect of the invention, the material thickness of the strap 22 along hinge section 84 is thinned. This introduces a controlled degree of weakness in the hinge section 84, such that the first few times strap 22 is moved to its closed position, the bending of its hinge section 84 causes a material yield in the hinge portion 84 which introduces a new permanent set in the strap 22. The new permanent set is in the direction of the closed position of the strap so that the development of potential energy in the strap when it is moved to the closed position the next time is effectively reduced. Typically, the new permanent set represented by the final spring back position of the strap 22 is between about 70° and 110° to provide an improved fling-free strap opening performance. Positioning the fixed end 82 of the strap at the top portion 32 of depending sidewall 30 ensures that the strap is bent no more than 180° when moved from its first open 0° condition shown in FIG. 4 to the closed 180° position of FIG. 2. Hinge placement together with the controlled material weakness designed into the strap member 22 substantially reduces or eliminates product flinging.

In the prior art caps, the fixed end of the strap was joined at the lower end 36 of the depending sidewall 30. This effectively meant that the strap was rotated by an amount greater than 180° on being moved to its closed position. Without providing a controlled area of weakness in the prior art straps, the maximum potential energy was developed on closure and upon release, the full resilient spring back of the strap caused the product to fling in the manner objected to by consumers evaluating prior art caps.

In still another aspect of this invention, preferred cap member 10 is provided with a universal recipe, controlled-flow pouring orifice 54. As shown in FIG. 5, pouring orifice 54 is provided with an inverted teardrop shape or configuration including a converging angled portion 88 disposed adjacent peripheral edge 34 and an opposed rounded or semi-circular portion 90. The apex 92 of angled portion 88 has been rounded to prevent blockage by particulates. The pouring orifice 54 with its inverted teardrop configuration accommodates more viscous, particulate containing dressings and still is suitable for lower viscosity dressings. Without wishing to be bound by any particular theory, it is generally believed that, in the pouring position, the large inverted teardrop design with its wider opening portion on top, better vented the cruet while pouring which promoted controlled flow of creamier, thicker recipe dressings as compared to the regular teardrop or circular openings of the prior art.

Although the present invention has been described with reference to certain preferred embodiments, modifications or changes may be made therein by those skilled in this art. For example, different sealing bottle contact structures and different cooperative orifice closure seals might be employed with the improved fling free strap and orifice configuration. Instead of making the cap member 10 from linear low density polyethylene, another resilient thermoplastic polymer molding composition approved for food-contact use may be employed. All such obvious changes may be made herein by those skilled in this art without departing from the scope and spirit of this invention as defined by the appended claims.

What is claimed is:

1. A substantially leak-proof, removable and reclosable cap for sealably engaging a top opening portion of a reusable shaker dispenser bottle, said cap comprising:

a cap body including a top wall and a depending peripheral sidewall, means for cooperatively forming a substantially leak-free, fluid tight seal between a top portion of a shaker dispenser bottle and the depending sidewall portion of said cap body, a pouring orifice disposed in said top wall to permit a fluid product to be poured therethrough in a controlled manner in use, an elongate flexible strap having a first end affixed to said cap body and having an opposed free end, said free end including a releasable orifice closure portion for cooperatively closing said pouring orifice in a substantially leak-free, fluid tight sealed manner, and said cap further including a thumb tab at said free end upon which a generally upwardly directed force is exerted to release said orifice closure portion, wherein said first fixed end of the strap extends normally away from said depending peripheral sidewall, from an upper end portion thereof so that when the strap is bent upwardly and inwardly so that its free end overlies said pouring orifice in a generally sideways, U-shaped configuration, a hinge section of the strap is disposed above and located at the depending peripheral sidewall, means for reducing the likelihood of product fling including said hinge section of the strap which is thinned adjacent to its said first end affixed to said cap body in order to reduce development of potential energy in the strap when the orifice closure portion is moved to a closed and locked position about the pouring orifice to thereby substantially reduce the tendency of the strap to resile upwardly and outwardly away from the pouring orifice upon exertion of said generally upwardly directed force onto said thumb tab to achieve said release of the orifice closure portion, and said pouring orifice includes an inverted teardrop configuration including a converging generally V-shaped portion and a spaced and opposed rounded portion, opposite said converging portion, said inverted teardrop orifice being disposed in said top wall such that the converging section is located adjacent the depending peripheral sidewall and said rounded portion is spaced inwardly therefrom.

2. A cap as defined in claim 1 wherein said cap body comprises a unitary resilient thermoplastic molded article.

3. A cap as defined in claim 1, wherein said top wall includes an elongate strap receiving central recess defined therein for receiving the strap in a closed position of the strap so that an outwardly facing surface of the strap lies substantially flush with a remaining upper facing surface of said top wall.

4. A cap as defined in claim 3, wherein said pouring orifice is disposed along a diametrical axis opposite said strap first fixed end portion.

5. A cap as defined in claim 4 wherein the strap receiving recess has a width which is 40 to 60% the diameter of the top wall.

6. A cap as defined in claim 5 wherein said pouring orifice provides improved venting and flow control for thick recipe and thin recipe fluid products intended to be dispensed through said pouring orifice.

7. A cap as defined in claim 4, wherein said pouring orifice includes an upwardly projecting circumferential latch lip disposed in said central recess portion for cooperatively latchingly sealingly engaging a complementary latch arm depending from all inner facing surface of said strap, said latch lip including a latch shoulder along its inwardly-facing side.

8. A cap as defined in claim 7, wherein the free end of said strap extends outwardly beyond the depending cooperative latch arm portion to define said thumb tab for facilitating disengagement of the cooperative latch arm on the strap from the latch lip on the pouring orifice.

9. A cap as defined in claim 8 wherein said depending peripheral sidewall includes a lower free end including a pair of outwardly extending thumb flanges extending on opposed sides of said cap body in lateral spaced relation from strap receiving recess to facilitate disengagement and removal of the cap from an open top portion of a reusable shaker dispenser bottle.

10. A cap as defined in claim 9 wherein said cap is rotationally flexible about longitudinally extending diametrical axis of symmetry bisecting the orifice and the strap.

11. A substantially leak-proof, removable and reclosable cap for sealably engaging a top opening portion of a reusable shaker dispenser bottle, said cap comprising:

a cap body including a top wall and a depending peripheral sidewall, means for cooperatively forming a substantially leak-free fluid tight seal between a top opening portion of a shaker dispenser bottle and the depending sidewall portion of said cap body, a pouring orifice disposed in said top wall to permit a fluid product to be poured therethrough, said pouring orifice being disposed in said top wall adjacent a peripheral edge thereof and spaced inwardly therefrom, said orifice further including means for providing improved venting and flow control for controlled dispensing of both thick recipe and thin recipe fluid product contents, an elongate flexible strap having a first end affixed to said cap body and having an opposed free end with a thumb tab and a releasable orifice closure portion thereon for cooperatively, releasably closing said pouring orifice in a substantially leak-free, fluid tight and sealed manner, said cap further including a thinned hinge section that reduces the likelihood of product fling upon exertion of a generally upwardly directed force on said thumb tab at said opposed free end of the strap to achieve release of the orifice closure portion from said pouring orifice, said thinned hinge section extending generally upwardly from and adjacent to said depending peripheral sidewall, and wherein said improved venting and flow control are provided by a shaped pouring orifice having an inverted teardrop configuration including a narrowing converging portion and an opposed rounded portion and said converging portion being disposed adjacent a peripheral edge portion of said top wall.

\* \* \* \* \*